UNITED STATES PATENT OFFICE.

LASZLÓ JANOWSKY, OF TORONTO, ONTARIO, CANADA.

PROCESS FOR TREATING COMMERCIAL CALCIUM CARBID.

1,308,243. Specification of Letters Patent. Patented July 1, 1919.

No Drawing. Application filed September 18, 1917. Serial No. 191,995.

*To all whom it may concern:*

Be it known that I, LASZLÓ JANOWSKY, a subject of the King of Hungary, of the city of Toronto, in the county of York, in the Province of Ontario, Canada, have invented certain new and useful Improvements in Processes for Treating Commercial Calcium Carbid, of which the following is the specification.

My invention relates to an improved process for treating commercial calcium carbid, whereby it may be rendered air proof, so that it must come in contact with water before generation takes place.

A further object is to prevent the losing of any gas during shipment due to exposure from opening and closing the box in which it is contained.

A still further obect is to make the chemical action of the carbid when so treated slow, so as to reduce the amount of heat generated, thus giving a purer gas.

Other objects are to eliminate impurities, so that the tubes will not be clogged, to make the conveying of the gas cheaper by the utilization of any suitable tubular conveyer, such as small wire tubing, iron pipes or rubber without liability of any corrosion of these or indeed of the mantles to which the gas passes.

With these and other objects in view I shall now describe my process whereby commercial carbid is treated. I first take eighty-five per cent. of fatty matter either animal, vegetable, or mineral oil, and fifteen per cent. of water glass (sodium silicate). I first apply heat to the sodium silicate to such an extent as to eliminate the water therein and reduce it to a powder. This may be done by electrical heat or heat produced in any other suitable manner, electrically applied heat being the most convenient. I then mix with fifteen per cent. of powdered material, sodium silicate with the water removed, that is, a powder, the eighty-five per cent. of fatty matter aforesaid. This has the effect of producing a liquid, which is in no sense a soap.

I then take the calcium carbid and this liquid, and by means of electrical, mechanical, or heat energy cause the liquid to permeate the carbid. As these methods form no part of my present invention, I do not describe them.

Such commercial carbid treated as I have described carries out the objects, which I have hereinbefore enumerated in this specification.

In addition to this I may say that the gas produced is excellent for burning with a mantle. The residue of the treated carbid, when used in a machine, is not sticky but is similar to sea sand, thus rendering it removable from the generator very easily. Any carbid, which remains or is in the generator, is not lost but may be used. As far as the heating qualities are concerned my treated carbid is of the same heating value as commercial carbid.

The proportion of fatty matter and powder may be varied to a more or less extent.

What I claim as my invention is.

1. The herein described method of producing an air proof calcium carbid from commercial carbid consisting of treating carbid with a composition of fatty matter and water glass (sodium silicate) having the water removed to produce a powder previous to its mixture with the fatty matter.

2. A process which comprises removing the water from (sodium silicate) water glass to produce a powder and then mixing such powder in the proportion of fifteen per cent. thereof with eighty-five per cent. of fatty matter.

LASZLÓ JANOWSKY.

Witnesses:
 B. BOYD,
 M. EGAN.